(12) United States Patent
Allione et al.

(10) Patent No.: US 9,146,406 B2
(45) Date of Patent: Sep. 29, 2015

(54) ACTIVE SYSTEM OF VISION AND ASSOCIATED METHOD FOR IMPROVING VISUAL COMFORT TO A WEARER

(71) Applicant: Essilor International (Compagnie Generale D'Optique), Paris (FR)

(72) Inventors: Pascal Allione, Paris (FR); Bruno Amir, Paris (FR)

(73) Assignee: ESSILOR INTERNATIONAL (COMPAGNIE GENERALE D'OPTIQUE), Charenton Le Pont (FR)

( * ) Notice: Subject to any disclaimer, the term of this patent is extended or adjusted under 35 U.S.C. 154(b) by 0 days.

(21) Appl. No.: 14/243,723

(22) Filed: Apr. 2, 2014

(65) Prior Publication Data
US 2014/0313475 A1    Oct. 23, 2014

(30) Foreign Application Priority Data
Apr. 2, 2013    (EP) .................................... 13162028

(51) Int. Cl.
G02C 7/00 (2006.01)
G02C 7/06 (2006.01)
G02C 7/10 (2006.01)

(52) U.S. Cl.
CPC ..... G02C 7/061 (2013.01); G02C 7/06 (2013.01); G02C 7/101 (2013.01)

(58) Field of Classification Search
CPC ............ G02C 7/06; G02C 7/042; G02C 7/02; G02C 7/10; C03B 23/22; G02B 1/041; A61F 2/145
USPC ............ 351/159.01, 159.41, 159.45, 159.49, 351/159.59, 201, 45
See application file for complete search history.

(56) References Cited

U.S. PATENT DOCUMENTS

| | | | |
|---|---|---|---|
| 4,253,747 A * | 3/1981 | Maitenaz | 351/159.42 |
| 6,511,175 B2 * | 1/2003 | Hay et al. | 351/45 |
| 7,976,158 B2 | 7/2011 | Drobe | |
| 2001/0050754 A1 * | 12/2001 | Hay et al. | 351/213 |

FOREIGN PATENT DOCUMENTS

| | | |
|---|---|---|
| WO | WO 2008/078320 | 7/2008 |
| WO | WO 2012/036638 | 3/2012 |

* cited by examiner

*Primary Examiner* — James Greece
(74) *Attorney, Agent, or Firm* — Cozen O'Connor

(57) ABSTRACT

Ophthalmic lens comprising: a primary zone on a first face; a secondary zone on the first face between said primary zone and the peripheral edge of the lens; first and second regions forming a partition of the secondary zone, which are contiguous and alternate with a pitch. A spectacle eyeglass obtained from said lens produces a first ophthalmic correction in the primary zone and in the first regions, and a second ophthalmic correction in the second regions different from said first ophthalmic correction. An active system of vision comprises an occultation device comprising: a selection device for selecting the wearer's viewing state; an optical occultation system to occult alternatively a first group and a second group according to the wearer's viewing state selected by the selection device, the first group comprising at least the primary zone and the first regions, and the second group comprising at least the second regions.

15 Claims, 4 Drawing Sheets

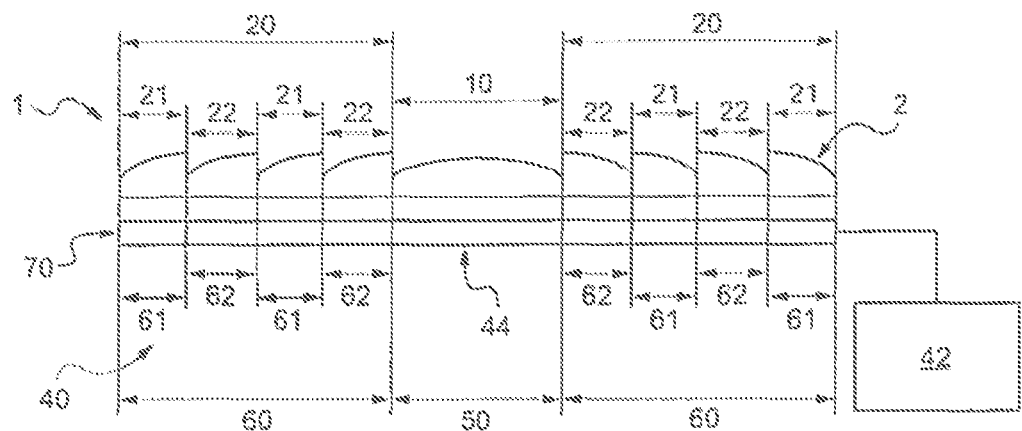
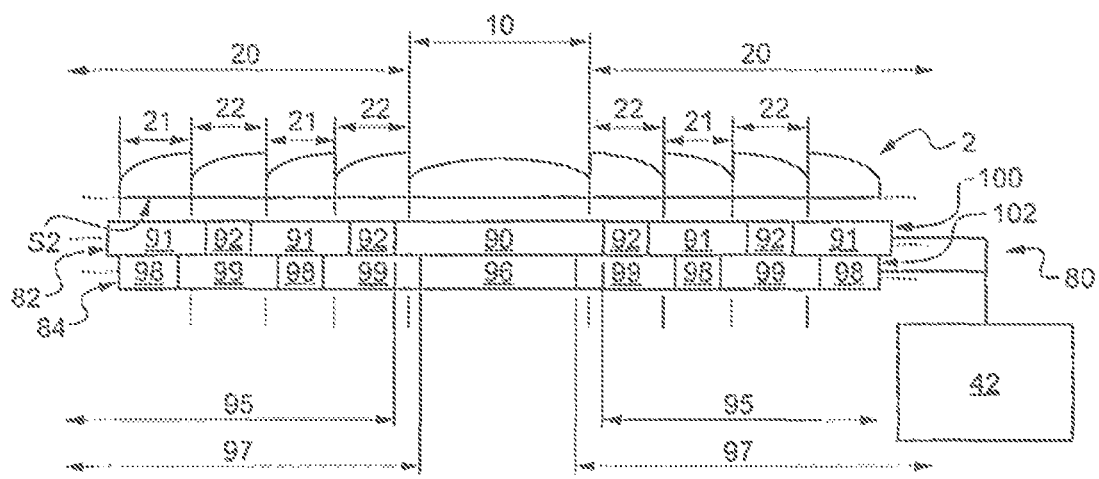

ACTIVE SYSTEM OF VISION AND ASSOCIATED METHOD FOR IMPROVING VISUAL COMFORT TO A WEARER

RELATED APPLICATIONS

This application claims the priority of European application no. 13162028.8 filed Apr. 2, 2013, the entire content of which is hereby incorporated by reference.

FIELD OF THE INVENTION

The invention relates to a method for improving comfort to a wearer and an active system of vision adapted to carry out the steps of the said method.

The invention further relates to a computer program product and a computer readable medium.

BACKGROUND OF THE INVENTION

The invention relates to the field of active optical elements, in particular to carry out an ophthalmic lens. In particular, the invention relates to the field of ophthalmic lenses which are adapted to correct two different visions, for example near vision and far vision. It is the case for presbyopic wearers who need a first ophthalmic correction for near vision and a second ophthalmic correction for far vision which is different from the first ophthalmic correction.

It is a common practice in the art to use multifocal lenses for improving comfort to presbyopic wearers. Nevertheless, traditional multifocal lenses, such as bifocal and trifocals, suffer from a number of disadvantages. There is a desire to improve the performance and cosmetic appeal of multifocal lenses. As an example, many traditional multifocal lenses have a visible discontinuity separating each vision zone. Blended multifocals can reduce the visibility associated with these abrupt discontinuities but generally at the cost of rendering the blend zones optically unusable due to high levels of distortion and/or astigmatism. Traditional progressive lenses can provide multiple vision zones with invisible boundaries and no image breaks but these lenses typically have narrow vision zones and are associated with large amounts of unwanted astigmatism.

U.S. Pat. No. 7,976,158 B2 describes another type of ophthalmic lenses which procure, for a wearer, corrections adapted for his foveal vision and for his peripheral vision. The eyeglass has a central zone that produces a first correction and a peripheral zone. The peripheral zone is divided into first and second contiguous regions. The first and second regions alternate and are dedicated to obtaining two respective ophthalmic corrections for the wearer of the finished eyeglass produced from the lens. Thus, the first and second regions are dedicated to obtaining respectively a first and a second correction, the second correction differing from the first correction. Furthermore, the first correction provided by the first regions is identical to that produced in the central zone. According to the invention, the first ophthalmic correction is determined for correcting the foveal vision of the wearer of the finished eyeglass and the second ophthalmic correction is determined for correcting the peripheral vision of this wearer. These two ophthalmic corrections differ from each other.

However, it may be difficult for a wearer to get used to this type of lenses that integrate two different ophthalmic corrections.

Other known solutions in the art introduce active optical system in order to solve these problems.

U.S. Pat. No. 7,883,207 describes multifocal lenses having one or more multifocal inserts comprising one or more diffractive regions. A diffractive region of a multifocal insert provide a constant optical power or a progression of optical power, or any combination thereof. A diffractive region of a multifocal insert is positioned to be in optical communication with one or more optical regions of a host lens to provide a combined desired optical power in one or more vision zones.

U.S. Pat. No. 5,815,233 A describes a liquid crystal active lens having, in combination, a fixed-focal-point lens having a high index of refraction and a phase modulation element comprising two-dimensionally arranged fine pixels, and having power and being capable of electrically controlling the lens characteristics as a function of space. An electrically controlled optical system is realized without having a moving portion. Owing to the combination of the liquid crystal element for modulating space phase and the high-power lens of a fixed focal length, it is possible to electronically control the focal length and to electronically control the lens in a spatially split manner.

These active optical systems are very complex and difficult to implement.

In consequence, there is a need, and particularly for presbyopic wearers, for a simple active system of vision integrating two different ophthalmic corrections which does not present problems of wearer adaptation and with no image breaks as in bifocals and trifocals lenses.

So, the invention is directed to an active system of vision integrating two different ophthalmic corrections and improving comfort to a wearer. The method carried out by the active system of vision and the active system of vision itself are simple to implement.

SUMMARY OF THE INVENTION

One aim of the present invention is to provide an active system of vision making it possible to integrate at least two different ophthalmic corrections prescribed to a wearer for different viewing state with enhanced visual comfort for the wearer.

To achieve this, the invention proposes an active system of vision for a wearer comprising:
  a lens for ophthalmic spectacles having a peripheral edge, comprising:
    a primary zone on a first face;
    a secondary zone on the first face located between said primary zone and at least a portion of the peripheral edge of the lens;
    first and second regions forming a partition of the secondary zone, which are contiguous and alternate with a pitch, the lens being adapted so that a spectacle eyeglass obtained from said lens produces a first ophthalmic correction in the primary zone and in the first regions and produces a second ophthalmic correction in the second regions which is different from said first ophthalmic correction;
    a second face opposed to the first face separated by a refringent medium;
  an occultation device comprising:
    a selection device adapted for selecting the wearer's viewing state among a first vision viewing state and a second vision viewing state;
    an optical occultation system adapted to occult alternatively a first group and a second group according to the wearer's viewing state selected by the selection device, the first group comprising at least the primary zone and the first regions, and the second group comprising at east the second regions.

In the frame of the present invention, the wording "an optical occultation system" is used to designate an active transparent optical element which has an electrically variable transfer function adapted to cause the disappearing of an object from wearer's view, for example by light darkening/blocking, light defocusing, light reflecting and/or light scattering.

Within the meaning of the invention, an optical element is transparent when an object that is located on a first side of the optical element can be viewed without significant loss of contrast by an observer who is himself across the optical element. The object and the observer are each located at distance of the optical element. In other words, an image of the object is formed through the optical element with no significant loss of quality of visual perception for the observer, also called "The wearer".

The invention achieves both a spatial multiplexing and an occultation of the zones or regions which do not produce the ophthalmic correction suitable to the detected vision viewing state.

Indeed, the active system of vision according to the invention integrates two different ophthalmic corrections, each adapted to a specific vision viewing state. In operating, everything happens as if the wearer has an ophthalmic lens having only a single correction suited to the detected vision viewing state by masking/occulting the second ophthalmic correction that is not adapted to the detected vision viewing state.

Thanks to the present invention, it is now possible to improve visual performance of a wearer by providing an active system of vision adapted to switch between a first and a second ophthalmic corrections.

Thanks to the invention, presbyopic wearers can thus have a simple active system of vision integrating a first ophthalmic correction suited to near vision and a second ophthalmic correction suited to far vision which does not present problems of wearer adaptation and with no image breaks as in bifocals and trifocals lenses.

According to an embodiment, the optical occultation system comprises a refringent medium having an electrically variable occultation between a first light occultation state and a second light occultation state, the first light occultation state being substantially transparent and the second light occultation state being substantially obscured.

This allows to limit the possible loss of brightness for the wearer.

According to another embodiment, the optical occultation system comprises a single layer juxtaposed to the first or second face. Furthermore, the single layer comprises:
  a primary area,
  a secondary area located between said central area and at least one portion of a peripheral edge of the layer, and
  first and second parts forming a partition of the secondary area, which are contiguous and alternate.
  Moreover, the optical occultation system is adapted so that;
  the primary area is adapted to occult at least the primary zone of the lens when the second vision viewing state is selected by the selection device;
  the first parts are adapted to occult at least the first regions of the lens when the second vision viewing state is selected by the selection device; and
  the second parts are adapted to occult at least the second regions of the lens when the first vision viewing state is selected by the selection device;

According to a variant of the previous embodiment, the optical occultation system comprises a first layer juxtaposed to the first or second face and a second layer juxtaposed to the first layer. The first layer is adapted to occult at least the primary zone and at least the first regions when the second vision viewing state is selected by the selection device, and the second layer is adapted to occult at least the second regions when the first vision viewing state is selected by the selection device.

According to another embodiment that can be combined with the previous ones, according to all the possible combinations, the first and the second regions are strips lying in an angular sector around the primary zone and alternating along a radial direction extending from said primary zone to the peripheral edge of the lens.

According to a subembodiment of the previous embodiment, strips are annular.

According to a variant of this previous subembodiment, the first and the second regions are straight strips lying in at least an angular sector around the primary zone and alternating along a direction extending from said primary zone to the peripheral edge of the lens.

According to another embodiment that can be combined with the previous ones, according to all the possible combinations, the first and the second ophthalmic corrections are each an optical power correction or an optical prismatic correction.

According to another embodiment that can be combined with the previous ones, according to all the possible combinations, the first and the second vision viewing state are chosen within a list consisting of a near vision viewing state, a far vision viewing state and an intermediate viewing state.

According to another embodiment that can be combined with the previous ones, according to all the possible combinations, the second face of the two faces having an aspheric surface, an atoric surface or a continuous surface chosen within the list consisting of: a spherical surface, a toric surface and a progressive surface.

According to another embodiment that can be combined with the previous ones, according to all the possible combinations, the active system of vision forms a semi-finished, finished eyeglass or a patch adapted to be disposed in front of a finished eyeglass.

According to another embodiment that can be combined with the previous ones, according to all the possible combinations, the selection device comprises an identification device adapted for carrying out a method for identifying the wearer's viewing state comprising at least a step chosen within the list consisting of:
  measuring an oculo-motor activity of an eye of the wearer;
  determining, for each eye, the actual gaze direction of the eye of the wearer when wearing the lens;
  determining a convergence of the eyes of the wearer;
  measuring the actual viewing distance of the eye of the wearer when wearing the lens; and
  measuring the actual inclination of the head of the wearer;
wherein the selection of the wearer's viewing state depends on the identification of the wearer's viewing state.

Moreover, the invention also proposes a method for improving visual comfort to a wearer comprising the following steps:
  providing an active system of vision as described hereinbefore;
  identifying the wearer's viewing state among the first vision viewing state and the second vision viewing state; and
  occulting alternatively the first group and the second group according to the wearer's viewing state selected by the selection device.

Furthermore, the invention also proposes a computer program product comprising one or more stored sequences of instructions that is accessible to a processor and which, when executed by the processor, causes the processor to carry out the steps of the preceding method.

The invention also proposes a computer readable medium storing one or more sequences of instructions of the preceding computer program product.

BRIEF DESCRIPTION OF THE DRAWINGS

Further features and advantages of the invention will appear from the following description of embodiments of the invention, given as non-limiting examples, with reference to the accompanying drawings listed hereunder:

FIG. 5 corresponds to FIG. 1a for a first optical occultation system of the active system of vision according to the invention; and FIG. 6 corresponds to FIG. 1a for a second embodiment of the optical occultation system of the active system of vision according to the invention.

For clarity, the dimensions of the elements represented in these figures are not in proportion to the actual dimensions, nor to the ratios of the actual dimensions. In addition, identical references in the different figures denote identical elements or elements with identical functions.

DETAILED DESCRIPTION OF THE INVENTION

The invention relates to a method and an associated system, for improving visual comfort to a wearer according to wearer's optical needs and wearers prescription data.

For instance, the wearer's optical needs are to have an ophthalmic lens suitable for specific vision viewing states as near vision viewing state, far vision viewing state.

According to the invention, an active system of vision 1 for a wearer, comprising a lens 2 for ophthalmic spectacles having a peripheral edge.

Figure 1A:
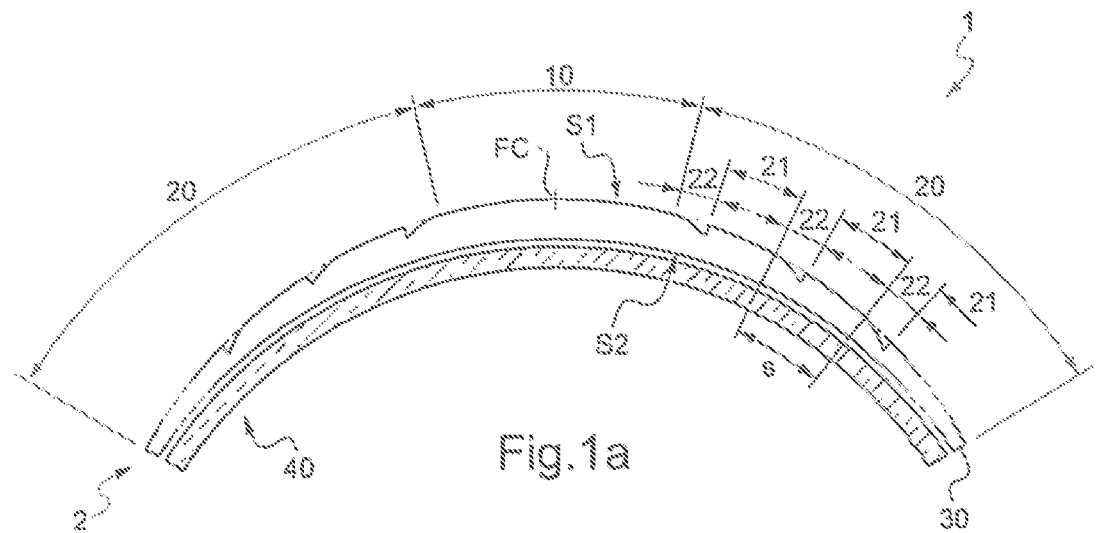
FIGS. 1a and 1b are two views of a first lens of the active system of vision according to the invention, in cross-section and in plan respectively.
Figure 1B:
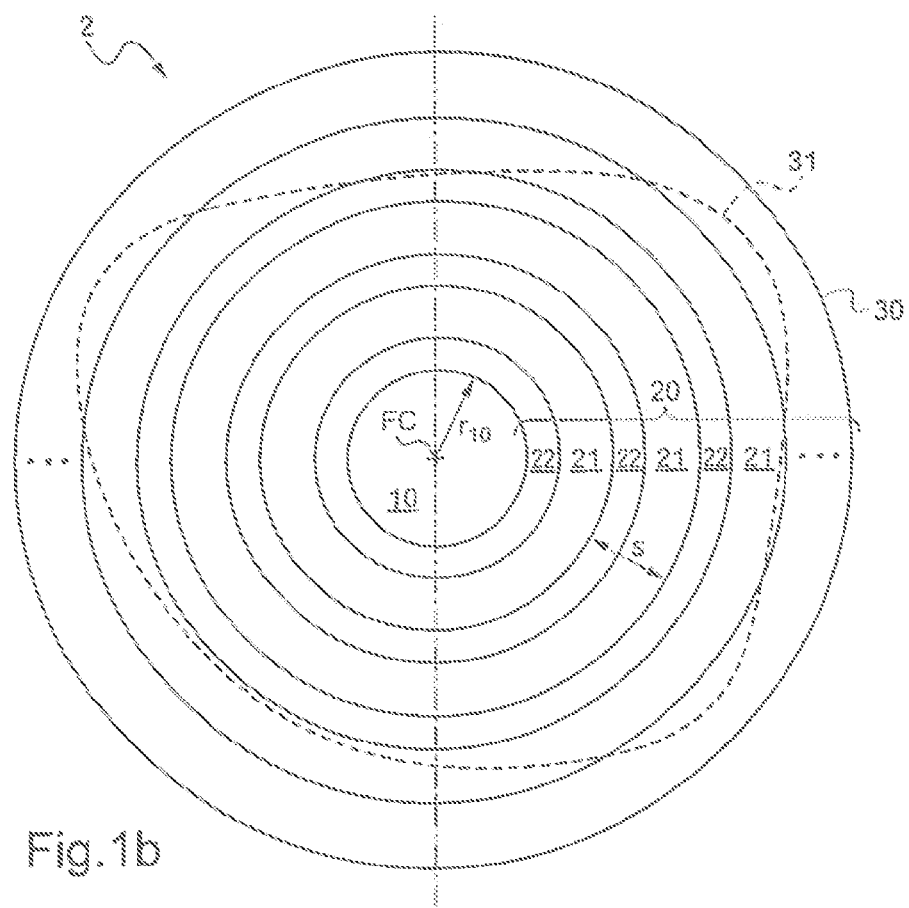

As shown in FIGS. 1a and 1b, the lens 2 has a first face S1 and a second face S2 opposed to the first face separated by a refringent medium. The first and second faces S1 and S2 can also be designated anterior face S1 and posterior face S2, relative to the position in which the lens 2 is used by a person wearing it.

For example, the second face of the two faces has an aspheric surface, an atoric surface or a continuous surface chosen within the list consisting of: a spherical surface, a toric surface and a progressive surface.

The lens 2 may form a semi-finished, a finished eyeglass or a patch adapted to be disposed in front of a finished eyeglass. The term "semi-finished lens" is understood to mean a spectacle lens blank, of which only one of the anterior and posterior faces possesses a definitive shape. The other face is then machined subsequently, especially to give the finished lens optical power values that correspond to the ametropia that was determined for the future wearer of the ophthalmic lens.

When the lens 2 is a semi-finished lens, it possesses an initial peripheral edge 30 that may be circular, for example with a diameter of 60 mm. When it is a finished lens, with its two faces S1 and S2 that are definitive, its peripheral edge may still be that of the semi-finished lens. This edge may also have been trimmed to the dimensions of an ophthalmic spectacle frame housing into which the lens is intended to be fitted. The contour 31 in FIG. 1b shows the edge of such a finished lens after trimming.

The lens 2 is divided into several zones parallel to one of the faces S1 or S2. Among these zones, the lens comprises a primary zone 10 and at least a secondary zone 20 for example on the first face S1. For simplicity, only one secondary zone 20 is illustrated on FIGS. 1a and 1b, but the invention is not limited to only a single secondary zone.

The primary zone 10 may be centred or not, for example with respect to a fitting cross FC of the lens 2 or with respect to any other reference point. This fitting cross FC is used for positioning the lens 2 with respect to the spectacle frame housing.

The secondary zone 20 is located between said primary zone and at least a portion of the peripheral edge of the lens. The secondary zone 20 extends between the primary zone 10 and the peripheral edge 30 or 31 of the lens 2. The secondary zone 20 may extend all around the primary zone 10 or in a limited angular sector around the latter.

The primary zone 10 is preferably contained in a disc of 3 mm radius. In this way, the secondary zone 20 has an area sufficient to implement the invention, even when the housing for the lens in the frame is small. Also preferably, the primary zone 10 may contain a disc of 15 µm (microns) radius. A significant proportion of the light rays that form an image in a zone of the wearer's retina then passes through the primary zone 10 when his line of sight passes through or is close to the centre of the primary zone 10.

The secondary zone 20 is divided into first and second contiguous regions that are referenced as 21 and 22 respectively. The regions 21 and 22 alternate with a pitch and are dedicated to obtaining two respective ophthalmic corrections for the wearer of the finished eyeglass produced from the lens 2. Thus, the regions 21 are dedicated to obtaining a first ophthalmic correction and the regions 22 are dedicated to obtaining a second ophthalmic correction that differs from the first ophthalmic correction. Furthermore, the first ophthalmic correction provided by the regions 21 is identical to that produced in the primary zone 10.

Preferably, the first and the second ophthalmic corrections are each an optical power correction or an optical prismatic correction.

In the lens 2 of an active system of vision according to the invention, the first regions 21 and the central zone 10 are produced in accordance with a first set of parameters corresponding to the first ophthalmic correction and the second regions 22 are produced in accordance with a second set of parameters corresponding to the second ophthalmic correction. For example, the first and second parameters may be curvatures of a face of the lens 2, for example the face 81, in the corresponding regions or zones. In this case, the face S1 has discontinuities in curvature between two regions 21 and 22 that are contiguous and also between the primary zone 10 and that region 22 which is contiguous with said primary zone. Optionally, these discontinuities in curvature may be superimposed on discontinuities in sagittal height, perpendicular to the face S1 (FIG. 1a).

The finished eyeglass therefore has a first optical power, denoted by P1, which is the same in the primary zone 10 and in the first regions 21, and a second optical power, denoted by P2, in each of the second regions 22. The optical power P2, within any one of the regions 22, may or may not be the same sign as the optical power P1 in the primary zone 10 and in the regions 21. The optical power P2 can be constant or can have monotonic variations from one region 22 to another, and optionally within each region 22.

Advantageously, the second regions 22 each have at least one dimension lying between 15 µm (microns) and 1000 µm, preferably between 25 µm and 50 µm. Thus, the partition of the secondary zone 20 between the regions 21 and 22 causes no significant diffraction, while remaining invisible or almost invisible to the naked eye. There is therefore no inconvenience to the wearer, and the aesthetic quality of the eyeglass remains compatible with the requirements in the ophthalmic field.

The alternating pitch of the first and second regions 21 and 22 is the distance separating two first regions 21 that are separated by a single second region 22. The pitch is denoted by s in the figures. This pitch has local values in the secondary zone 20. Within the secondary zone 20, it may be constant or vary, while still remaining less than 2 mm.

Moreover, in a preferred arrangement of the first and second regions 21, 22 in the secondary zone 20, they may be strips that are arranged in the angular sector of the secondary zone 20 around the primary zone 10.

These strips of first and second regions 21, 22 may be annular and alternate along radial directions going from the primary zone 10 to the peripheral edge 30 or 31. In this case, the width of each strip of second region 22 may be between 15 µm and 1000 µm, preferably between 25 µm and 50 µm, along the radial directions stemming from the primary zone and in particular from the fitting cross FC for the example illustrated in FIGS. 1a and 1b.

Figures 2A, 2B:
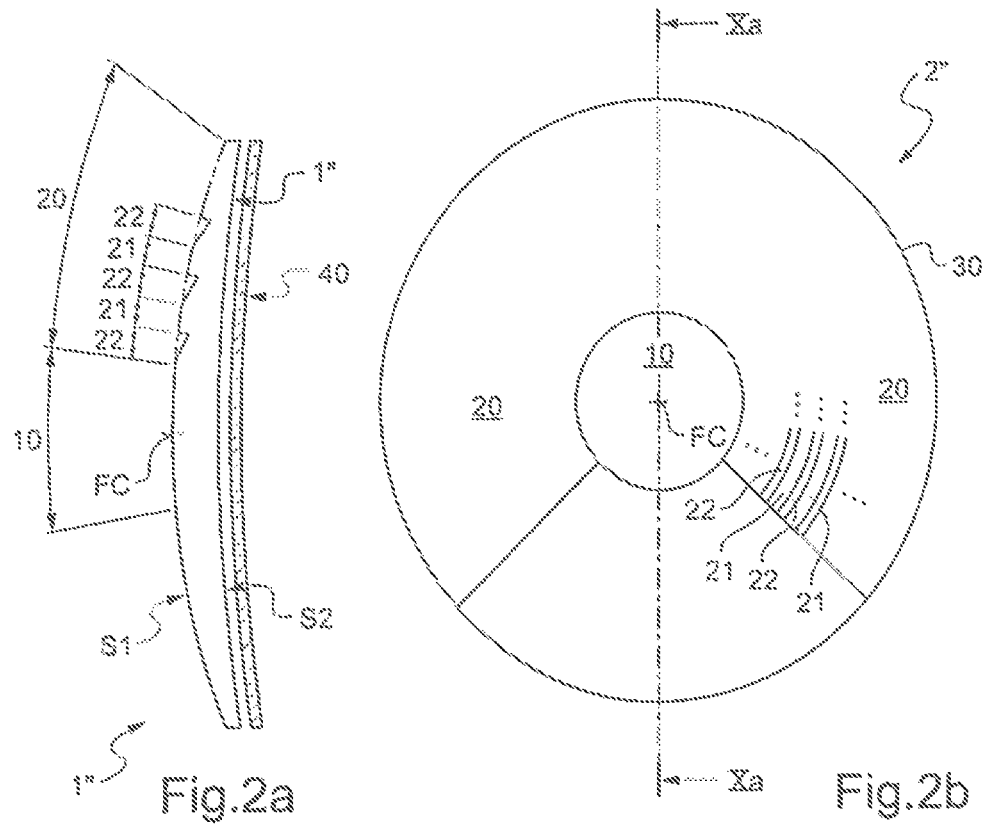
FIGS. 2a and 2b correspond to FIGS. 1a and 1b respectively, for a second lens of the active system of vision according to the invention.

FIGS. 2a and 2b illustrate an example of an active system of vision wherein the annular strips are arranged in only an angular sector of the secondary zone 20 around the primary zone 10 and do not surround the entire primary zone 10.

Figure 3:
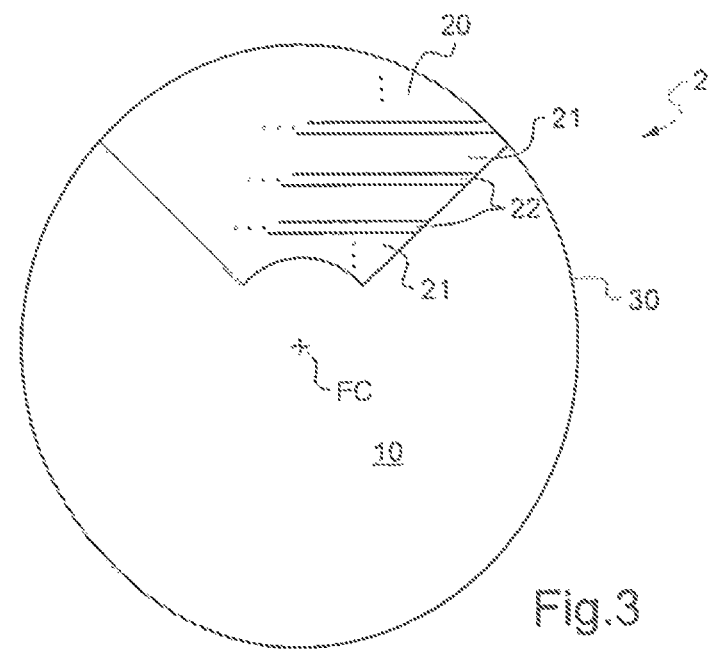
FIG. 3 is a view of a third embodiment of a lens of the active system of vision according to the invention in plan.

According to another embodiment illustrated in FIG. 3, the first and second regions 21, 22 may be straight strips lying in at least an angular sector around the primary zone and alternating along a direction going from the primary zone 10 to the peripheral edge 30 or 31. In this case, the width of each strip of second region 22 may be between 15 µm and 1000 µm, preferably between 25 µm and 50 µm, along the direction stemming from the primary zone.

Figure 4A:
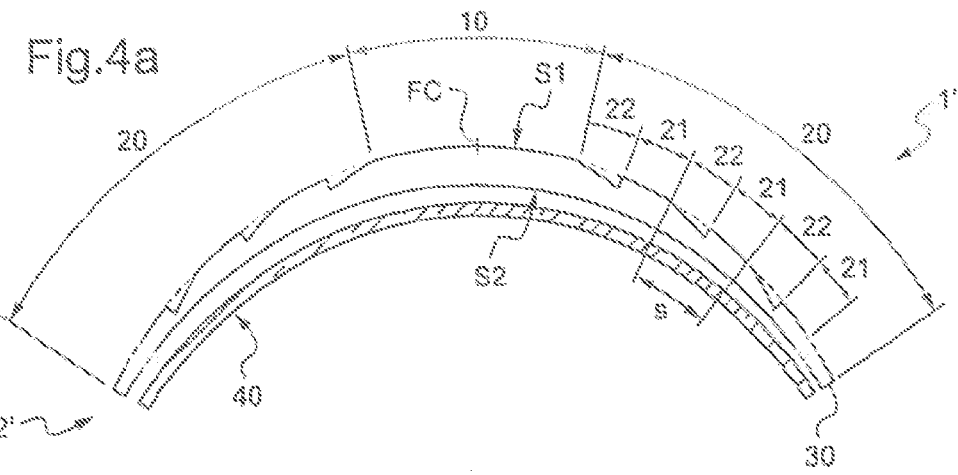
FIGS. 4a and 4b are two views of a fourth embodiment of a lens of the active system of vision according to the invention, in cross-section and in plan respectively.
Figure 4B:
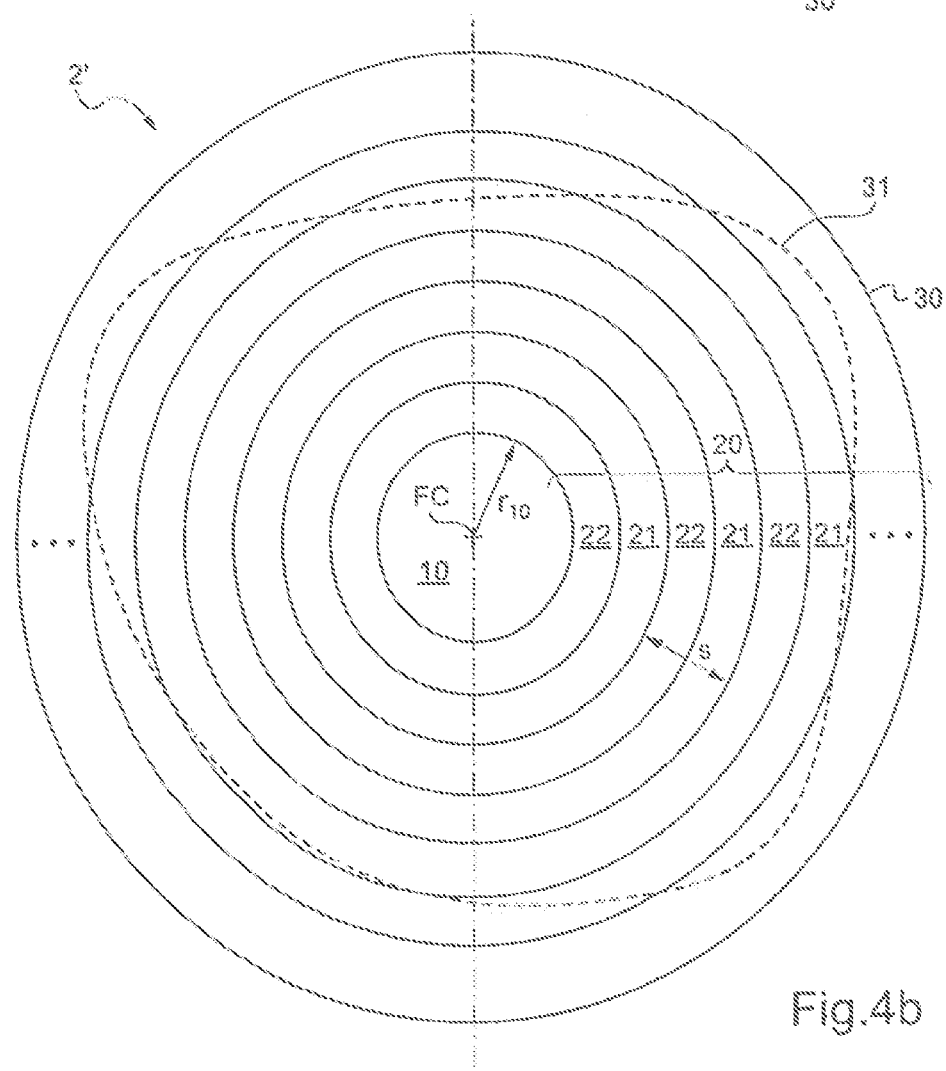

The lens shown in FIGS. 4a and 4b has the general reference 2'. The lenses 2 and 2' have respective primary zones 10 of the same size. On the example illustrated on FIGS. 4a and 4b, they are circular and centred on the fitting cross FC, with the same radius r10. At the same time, the alternating pitch s of the first and second regions 21, 22 is the same for the lenses 2 and 2'. The lenses 2 and 2' differ by the values of the period ratio of the first and second regions 21, 22. In the present description, the phrase "period ratio" of the first and second regions 21, 22 is understood to mean the quotient of the width of the second regions 22, i.e. along the direction of alternation with the first regions 21, divided by the local value of the alternating pitch s. This period ratio may be constant or may vary in the secondary zone 20.

According to two refinements of the invention, the size of the primary zone 10 on the one hand, and the proportion between the first regions 21 and the second regions 22 on the other, may be adapted to the wearer of the eyeglass according to his propensity to rotate his eyes or his head more when he looks in succession at objects that are in two different directions. It should be understood that the size of the primary zone 10 and the proportion between the first and second regions 21, 22 may thus be adapted independently of each other. In particular, only the size of the primary zone 10 may be adapted to the wearer in this way, or else only the proportion between the first and second regions 21, 22.

According to the invention, the active system of vision 1 further comprises an occultation device 40 which comprises a selection device 42 and an optical occultation system 44 as illustrated in FIG. 5.

The selection device 42 is adapted for selecting the wearer's viewing state among a first vision viewing state and a second vision viewing state.

Preferably, the first and the second vision viewing state are chosen within a list consisting of a near vision viewing state, a far vision viewing state and an intermediate viewing state.

The selection device 42 can be activated manually by the wearer by pushing a button for example when the wearer is in the first vision viewing state or in the second vision viewing state.

According to another example, the selection device 42 can be activated automatically. For this purpose, the selection device 42 comprises an identification device adapted for carrying out a method for identifying the wearer's viewing state and the selection of the wearer's viewing state depends on the identification of the wearer's viewing state. Identification of the wearer's viewing state can be carried on by measuring an oculo-motor activity of an eye of the wearer, or determining, for each eye, the actual gaze direction of the eye of the wearer when wearing the lens or determining a convergence of the eyes of the wearer. Another method for identifying the wearer's viewing state is to measure the actual viewing distance of the eye of the wearer when wearing the lens or measure the actual inclination of the head of the wearer.

The optical occultation system 44 is adapted to occult alternatively a first group and a second group according to the wearer's viewing state selected by the selection device 42. The first group comprises at least the primary zone 10 and the first regions 21, and the second group comprises at least the second regions 22.

Thus, when the first vision viewing state is selected for example, the occultation device occults only the zones and/or regions of the lens 2 which do not present the ophthalmic correction that is adapted to this first vision viewing state. So, thanks to the active system of vision according to the invention, the light rays passe only through the zones and/or regions of the lens presenting the ophthalmic correction adapted to this first vision viewing state and which are not occulted to the eyes of the wearer.

Preferably, the optical occultation system 44 comprises a refringent medium having an electrically variable occultation between a first light occultation state and a second light occultation state. The first light occultation state is substantially transparent and the second light occultation state is substantially obscured.

Within the meaning of the present invention, "an optical element obscured" means that the image of an object formed through the optical element is indistinct or hidden from view of the wearer. For example, the obscuration is achieved by occultation of at least a part of the optical element. Occultation refers to limitation of the visual information entering in the eye, quantitatively, for example by light darkening/blocking and/or light reflecting and/or to alteration of visual information entering in the eye, qualitatively, for example by light defocusing and/or light scattering.

According to a first subembodiment of the optical occultation system, the optical occultation system comprises a single layer juxtaposed to the first or second face S1, S2. Within the meaning of the present invention, "juxtaposed"

means that the distance between the single layer and the first or second face S1, S2 of the lens is less than 1 mm. Parallax effects decrease with this distance.

The single layer comprises a primary area 50 and a secondary area 60 located between said primary area 50 and at least one portion of a peripheral edge 70 of the layer.

The single layer further comprises first and second parts 61, 62 forming a partition of the secondary area 60, which are contiguous and alternate.

According to the first subembodiment of the optical occultation system, the optical occultation system is configured so that the primary area 50 is adapted to occult at least the primary zone 10 of the lens 2 when the second vision viewing state is selected by the selection device or identified by the identification device of the selection device. Thus, the shape and dimensions of the primary area 50 are at least the same than those of the primary zone 10 of the lens 2.

Moreover, the optical occultation system is configured so that the first parts 61 are adapted to occult at least the first regions 21 of the lens 2 when the second vision viewing state is selected by the selection device. Thus, the shape and dimensions of the first parts 61 are at least the same than those of the first regions 21 of the lens 2.

Furthermore, the optical occultation system is configured so that the second parts 62 are adapted to occult at least the second regions 22 of the lens 2 when the first vision viewing state is selected by the selection device. Thus, the shape and dimensions of the second parts 62 are at least the same than those of the second regions 22 of the lens 2.

Preferably, the dimensions of respectively the primary area 50, the first parts 61 and the second parts 62 are larger than respectively those of the primary zone 10, the first regions 21 and the second regions 22 of the lens 2. Thus, the partition of the secondary area 60 between the first and the second parts 61 and 62 causes no significant parallax effects and no alignment defects.

In reference to FIG. 6 and according to a second subembodiment of the optical occultation system, not compatible with the first subembodiment, the optical occultation system 80 comprises a first layer 82 juxtaposed to the first or second face S1, S2 and a second layer 84 juxtaposed to the first layer 82. Within the meaning of the present invention, "juxtaposed" means that the distance between the first layer 82 and the first or second face S1, S2 of the lens and between the first and the second layer 82, 84 are each less than 1 mm. Parallax effects decrease with this distance.

The first layer is adapted to occult at least the primary zone 10 and at least the first regions 21 when the second vision viewing state is selected by the selection device.

For this purpose, the first layer 82 comprises a primary area 90 and a secondary area 95 located between said primary area 90 and at least one portion of a peripheral edge 100 of the first layer 82.

The first layer further comprises first and second parts 91, 92 forming a partition of the secondary area 95, which are contiguous and alternate.

The first layer 82 of the optical occultation system is configured so that the primary area 90 is adapted to occult at least the primary zone 10 of the lens 2 when the second vision viewing state is selected by the selection device or identified by the identification device of the selection device. Thus, the shape and dimensions of the primary area 90 are at least the same than those of the primary zone 10 of the lens 2.

Moreover, the first layer 82 of the optical occultation system is configured so that the first parts 91 of the secondary area 95 are adapted to occult at least the first regions 91 of the lens 2 when the second vision viewing state is selected by the selection device. Thus, the shape and dimensions of the first parts 91 are at least the same than those of the first regions 21 of the lens 2.

Preferably, the dimensions of respectively the primary area 90 and the first parts 91 are larger than respectively those of the primary zone 10 and the first regions 21 of the lens 2 as illustrated on FIG. 6. Thus, the partition of the secondary area 90 between the first and the second parts 91 and 92 causes no significant parallax effects and no alignment defects.

The second layer 84 is adapted to occult at least the second regions 22 when the first vision viewing state is selected by the selection device.

For this purpose, the second layer 84 comprises a primary area 96 and a secondary area 97 located between said primary area 96 and at least one portion of a peripheral edge 102 of the second layer 84.

The second layer further comprises first and second parts 98, 99 forming a partition of the secondary area 97, which are contiguous and alternate.

The second layer 84 of the optical occultation system is configured so that the second parts 99 are adapted to occult at least the second regions 22 of the lens 2 when the first vision viewing state is selected by the selection device. Thus, the shape and dimensions of the second parts 99 are at least the same than those of the second regions 22 of the lens 2.

Preferably, the dimensions of the second parts 99 are larger than those of the second regions 22 of the lens 2 as illustrated on FIG. 6. Thus, the partition of the secondary area 97 between the first and the second parts 98 and 99 causes no significant parallax effects and no alignment defects.

In operation, the active system of vision is adapted to carry out the steps of the method for improving visual comfort of a wearer according to the invention.

This method comprises a step for providing an active system of vision as described before.

A finished eyeglass in accordance with the invention may be produced from a semi finished eyeglass in which either the anterior face S1 or the posterior face S2 determines the primary zone 10 and the secondary zone 20 divided into regions 21 and 22 as described above. When the other face is machined into a spherical or toric shape, the semi-finished eyeglass sets the difference between the ophthalmic corrections that will be produced by the finished eyeglass in the primary zone 10 and the first regions 21 on the one hand and in at least one of the second regions 22 on the other, respectively.

The method further comprises a step for identifying the wearer's viewing state among the first vision viewing state and the second vision viewing state.

Then the first group and the second group are alternatively occult according to the wearer's viewing state identified by the selection device.

Thanks to the invention, the width of the visual field perceived by the wearer is increased compared to a traditional multifocal lens and the swim effect is minimized while minimizing the variations of luminosity when one passes from a vision viewing state to another.

The active system of vision is arranged so that the variations of luminosity of a vision viewing state with another are less to 10% and preferably less than 5%. For example, the corresponding sizes of the surface of the zones and the regions are adapted to minimize the variations of luminosity when one passes from a vision viewing state to another.

Furthermore, the invention also relates to a computer program product comprising one or more stored sequence of instructions that is accessible to a processor and which, when executed by the processor, causes the processor to carry out the steps of the different embodiments of the preceding methods.

The invention also proposes a computer readable medium carrying out one or more sequences of instructions of the preceding computer program product.

Unless specifically stated otherwise, as apparent from the following discussions, it is appreciated that throughout the specification discussions utilizing terms such as "evaluating", "computing", "calculating" "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

It should be noted more generally that the invention is not limited to the described and represented examples.

It will be understood that the invention may be implemented by modifying the numerical values given in the detailed description above. Likewise, the primary zone, the secondary zone, and the first and second regions may have shapes differing from those described.

It will be understood that the invention may be implemented for lenses integrating N different ophthalmic corrections.

For example, the lens can comprise a primary zone 10 and two secondary zones 20-A and 20-B, each of the secondary zones 20-A and 20-B is divided into first and second contiguous regions denoted 21-A, 22-A for the first secondary zone 20-A and 21-B, 22-B for the first secondary zone 20-B. The regions 21-A and 22-A alternate with a pitch and are dedicated to obtaining two respective ophthalmic corrections for the wearer of the finished eyeglass produced from the lens 2. The two respective ophthalmic corrections are noted P1-A and P2-A, P1-A being different from P2-A but being identical to that produced in the primary zone 10. The regions 21-B and 22-B alternate with a pitch and are dedicated to obtaining two respective ophthalmic corrections for the wearer of the finished eyeglass produced from the lens 2. The two respective ophthalmic corrections are noted P1-B and P2-B. The two respective ophthalmic corrections are noted P1-B and P2-B, P1-B being different from P2-B but being identical to that produced in the primary zone 10. In the two secondary zones 20-A and 20-B, the respective ophthalmic corrections noted P2-A and P2-B can be identical or different. In the case wherein, the respective ophthalmic corrections noted P2-A and P2-B are different, the lens 2 integrates three different ophthalmic corrections:

the ophthalmic correction produced in the primary zone 10, denoted P1, and in the first regions of the first and the second secondary zones denoted P1-A and P1-B, with P1=P1-A=P1-B;

the ophthalmic correction produced in the second regions of the first secondary zone, denoted P2-A; and the ophthalmic correction produced in the second regions of the second secondary zone, denoted P2-B.

Of course, the occultation device is adapted in consequence. Indeed; the selection device of the occultation device is adapted for selecting the wearers viewing state among a first vision viewing state, a second vision viewing state and a third vision viewing state. Furthermore, the optical occultation system of the occultation device is adapted to occult alternatively a first group, a second group and a third group according to the wearers viewing state selected by the selection device:

the first group comprising at least the primary zone and the first regions of the first and the second secondary zones, the second group comprising at least the second regions of the first secondary zones, and the third group comprising at least the second regions of the second secondary zones.

According to another example, the lens can comprise a primary zone 10 which is adapted to produce a first ophthalmic correction noted P1 and at least one secondary zones 20 which is adapted to produce three different ophthalmic corrections P1, P2 and P3. For this purpose, the secondary zone 20 is divided into first, second and third contiguous regions. The first, second and third regions alternate with a pitch and are dedicated to obtaining the three respective ophthalmic corrections for the wearer of the finished eyeglass produced from the lens 2. Thus, the first regions are dedicated to obtaining a first ophthalmic correction that is identical to that produced in the primary zone 10, P1. The second and third regions are dedicated to obtaining respectively a second and a third ophthalmic corrections, denoted P2 and P3 that are different from P1. Moreover, P2 is different from P3. Thus, the lens 2 integrates three different ophthalmic corrections.

Of course, the occultation device is adapted in consequence. Indeed; the selection device of the occultation device is adapted for selecting the wearer's viewing state among a first vision viewing state, a second vision viewing state and a third vision viewing state. Furthermore, the optical occultation system of the occultation device is adapted to occult alternatively a first group, a second group and a third group according to the wearer's viewing state selected by the selection device:

the first group comprising at least the primary zone and the first regions of the secondary zone, the second group comprising at least the second regions of the secondary zone, and the third group comprising at least the third regions of the secondary zone.

The invention claimed is:

1. An active system of vision for a wearer comprising:
a lens for ophthalmic spectacles having a peripheral edge, comprising:
a primary zone on a first face;
a secondary zone on the first face located between said primary zone and at least a portion of the peripheral edge of the lens;
at least first and second regions forming a partition of the secondary zone, which are contiguous and alternate with a pitch, the lens being adapted so that a spectacle eyeglass obtained from said lens produces a first ophthalmic correction in the primary zone and in the first regions and produces a second ophthalmic correction in the second regions which is different from said first ophthalmic correction;
a second face opposed to the first face separated by a refringent medium;
an occultation device comprising:
a selection device adapted for selecting the wearer's viewing state among a first vision viewing state and a second vision viewing state;
an optical occultation system adapted to occult alternatively a first group and a second group according to the wearer's viewing state selected by the selection device, the first group comprising at least the primary zone and the first regions, and the second group comprising at least the second regions.

2. The active system of vision according to claim 1, wherein the optical occultation system comprises a refringent medium having an electrically variable occultation between a first light occultation state and a second light occultation state, the first light occultation state being substantially transparent and the second light occultation state being substantially obscured.

3. The active system of vision according to claim 1, wherein:
the optical occultation system comprises a single layer juxtaposed to the first or second face;
the single layer comprises:
a primary area;
a secondary area located between said central area and at least one portion of a peripheral edge of the layer;
first and second parts forming a partition of the secondary area, which are contiguous and alternate,
the optical occultation system is adapted so that:
the primary area is adapted to occult at least the primary zone of the lens when the second vision viewing state is selected by the selection device;
the first parts are adapted to occult at least the first regions of the lens when the second vision viewing state is selected by the selection device; and
the second parts are adapted to occult at least the second regions of the lens when the first vision viewing state is selected by the selection device.

4. The active system of vision according to claim 1, wherein:
the optical occultation system comprises a first layer juxtaposed to the first or second face and a second layer juxtaposed to the first layer;
the first layer is adapted to occult at least the primary zone and at least the first regions when the second vision viewing state is selected by the selection device; and
the second layer is adapted to occult at least the second regions when the first vision viewing state is selected by the selection device.

5. The active system of vision according to claim 1, wherein the first and the second regions are strips lying in at least an angular sector around the primary zone and alternating along a radial direction extending from said primary zone to the peripheral edge of the lens.

6. The active system of vision according to claim 5, wherein strips are annular.

7. The active system of vision according to claim 1, wherein the first and the second regions are straight strips lying in at least an angular sector around the primary zone and alternating along a direction extending from said primary zone to the peripheral edge of the lens.

8. The active system of vision according to claim 1, wherein the first and the second ophthalmic corrections are each an optical power correction or an optical prismatic correction.

9. The active system of vision according to claim 1, wherein the first and the second vision viewing state are chosen within a list consisting of a near vision viewing state, a far vision viewing state and an intermediate viewing state.

10. The active system of vision according to claim 1, wherein the second face of the two faces having an aspheric surface, an atoric surface or a continuous surface chosen within the list consisting of: a spherical surface, a toric surface and a progressive surface.

11. The active system of vision according to claim 1, forming a semi-finished, finished eyeglass or a patch adapted to be disposed in front of a finished eyeglass.

12. The active system of vision according to claim 1, wherein the selection device comprises an identification device adapted for carrying out a method for identifying the wearer's viewing state comprising at least a step chosen within the list consisting of:
measuring an oculo-motor activity of an eye of the wearer;
determining, for each eye, the actual gaze direction of the eye of the wearer when wearing the lens;
determining a convergence of the eyes of the wearer;
measuring the actual viewing distance of the eye of the wearer when wearing the lens; and
measuring the actual inclination of the head of the wearer;
wherein the selection of the wearer's viewing state depends on the identification of the wearer's viewing state.

13. Method for improving visual comfort to a wearer comprising the following steps:
providing an active system of vision according to claim 1;
identifying the wearer's viewing state among the first vision viewing state and the second vision viewing state;
occulting alternatively the first group and the second group according to the wearer's viewing state selected by the selection device.

14. A computer program product comprising one or more stored sequences of instructions that is accessible to a processor and which, when executed by the processor, causes the processor to carry out the steps of claim 13.

15. A computer readable medium storing one or more sequences of instructions of the computer program product of claim 14.

* * * * *